(12) United States Patent
Iida et al.

(10) Patent No.: US 11,656,533 B2
(45) Date of Patent: May 23, 2023

(54) OPTICAL SYSTEM AND CAMERA MODULE

(71) Applicant: Sharp Sensing Technology Corporation, Tenri (JP)

(72) Inventors: Akihiro Iida, Tenri (JP); Yoshihito Ishizue, Tenri (JP)

(73) Assignee: Sharp Sensing Technology Corporation, Tenri (JP)

( * ) Notice: Subject to any disclaimer, the term of this patent is extended or adjusted under 35 U.S.C. 154(b) by 0 days.

(21) Appl. No.: 17/550,570

(22) Filed: Dec. 14, 2021

(65) Prior Publication Data
US 2023/0103478 A1  Apr. 6, 2023

(30) Foreign Application Priority Data

Sep. 3, 2021 (JP) .............................. JP2021-144205

(51) Int. Cl.
*G03B 13/36* (2021.01)
*H04N 5/225* (2006.01)
*G02B 13/00* (2006.01)

(52) U.S. Cl.
CPC ......... *G03B 13/36* (2013.01); *G02B 13/0065* (2013.01); *H04N 5/2254* (2013.01); *H04N 5/2257* (2013.01)

(58) Field of Classification Search
CPC .. G03B 13/36; G02B 13/0065; H04N 5/2254; H04N 5/2257
See application file for complete search history.

(56) References Cited

U.S. PATENT DOCUMENTS

| 8,654,242 B2* | 2/2014 | Matsusaka ......... G02B 13/0045 |
| | | 348/340 |
| 9,223,118 B2* | 12/2015 | Mercado .............. G02B 13/004 |
| 9,392,188 B2* | 7/2016 | Shabtay ................. G02B 13/04 |
| 9,823,439 B2* | 11/2017 | Hashimoto .............. G02B 9/60 |
| 10,371,928 B2 | 8/2019 | Goldenberg et al. |

FOREIGN PATENT DOCUMENTS

| JP | 5611533 B2 | 10/2014 |
| JP | 2021-33180 A | 3/2021 |

* cited by examiner

*Primary Examiner* — Abdelaaziz Tissire
(74) *Attorney, Agent, or Firm* — ScienBiziP, P.C.

(57) ABSTRACT

An optical system includes a first lens group, a second lens group, and a lens drive device. The first lens group and the second lens group satisfy conditional expressions (1) to (5) below:

$$-6.0 < f/f_2 < -2.0 \quad (1)$$

$$ih/f < 0.4 \quad (2)$$

$$0.7 < TTL/f < 1.0 \quad (3)$$

$$1.6 < Fno < 7.0 \quad (4)$$

$$De_2 < De_1. \quad (5)$$

7 Claims, 10 Drawing Sheets

FOCUSING AT INFINITY

FOCUSING AT 500 mm

OPTICAL SYSTEM AND CAMERA MODULE

BACKGROUND

1. Field

The present disclosure relates to an optical system, and a camera module.

2. Description of the Related Art

Camera modules employing a unit-focusing system are known in the related art. Such a unit-focusing camera module includes multiple imaging lenses for imaging a subject, a lens barrel that holds the imaging lenses, and a lens drive device that drives the lens barrel. The lens barrel holding the whole set of imaging lenses is shifted as a unit for focusing (Japanese Patent No. 5611533 (registered on Sep. 12, 2014)).

Other known unit-focusing camera modules are designed to reduce the thickness of a smartphone incorporating such a camera module. Such a unit-focusing camera module includes a reflector element such as a prism or mirror disposed forward of multiple imaging lenses. The direction of the optical axis for light travelling from a subject can be tilted by the reflector element from a direction perpendicular to the smartphone back surface to a direction parallel to the smartphone back surface (U.S. patent Ser. No. 10/371,928 (registered on Aug. 6, 2019)).

According to the technique described in Japanese Patent No. 5611533 above, for the imaging lenses to move along the optical axis by a length equal to an amount of shift by which to shift the imaging lenses for unit focusing (to be referred to also as "amount of unit shift" hereinafter), a gap large enough to allow such movement is to be provided. This may present a problem in particular for camera modules including a telephoto lens with a large focal length. Such camera modules involve a large amount of unit shift for focusing, which leads to increased module size. This may make it difficult to reduce the size and weight of the camera module.

The above-mentioned problem may be addressed by combining a unit-focusing system with a folded optical system as described in U.S. patent Ser. No. 10/371,928 mentioned above. However, this approach involves providing, between the lens and the reflector element, a gap distance greater than or equal to the amount of unit shift of the lens to be provided by the lens drive device.

The presence of such gap distance causes a light beam to spread by an amount corresponding to the lens's angle of view. Spreading of a light beam leads to a corresponding increase in the size of the reflector element to be provided. This also leads to an increase in the thickness or footprint of the camera module.

Accordingly, even for the above-mentioned system according to U.S. patent Ser. No. 10/371,928, an attempt to obtain a camera module that allows for increased amount of unit shift similarly may lead to increased size of the resulting camera module, which may make it difficult to reduce the size and weight of the camera module.

It is desirable to achieve reductions in the size and weight of an optical system and a camera module.

SUMMARY

According to an aspect of the present disclosure, there is provided an optical system including a first lens group, a second lens group, and a lens drive device. The first lens group receives object light. The first lens group includes two or more lenses, and has positive power as a whole. The second lens group is disposed rearward of the first lens group to collect light onto an imager. The second lens group includes one or more lenses, and has negative power as a whole. The lens drive device drives the second lens group along an optical axis of the second lens group. During focusing on an object at close range that emits object light, a distance between the first lens group and the imager along the optical axis does not change. The first lens group and the second lens group satisfy conditional expressions (1) to (5) below:

$$-6.0 < f/f2 < -2.0 \tag{1}$$

$$ih/f < 0.4 \tag{2}$$

$$0.7 < TTL/f < 1.0 \tag{3}$$

$$1.6 < Fno < 7.0 \tag{4}$$

$$De2 < De1, \tag{5}$$

where
f represents an actual focal length of the first lens group and the second lens group as a whole,
f2 represents a focal length of the second lens group,
ih represents a maximum image height of the first lens group and the second lens group as a whole,
TTL represents a distance to an image plane from an object-side surface of a lens, the lens being a lens of the first lens group that is located closest to the object,
Fno represents an F-number of the first lens group and the second lens group as a whole,
De1 represents an optical effective diameter of the first lens group, and
De2 represents an optical effective diameter of the second lens group.

According to an aspect of the present disclosure, there is provided a camera module including an optical system according to an aspect of the present disclosure, and an imager having an image plane onto which object light is collected after passing through the optical system. The imager performs photoelectric conversion on the object light.

DESCRIPTION OF THE EMBODIMENTS

Embodiment 1

Figure 1:
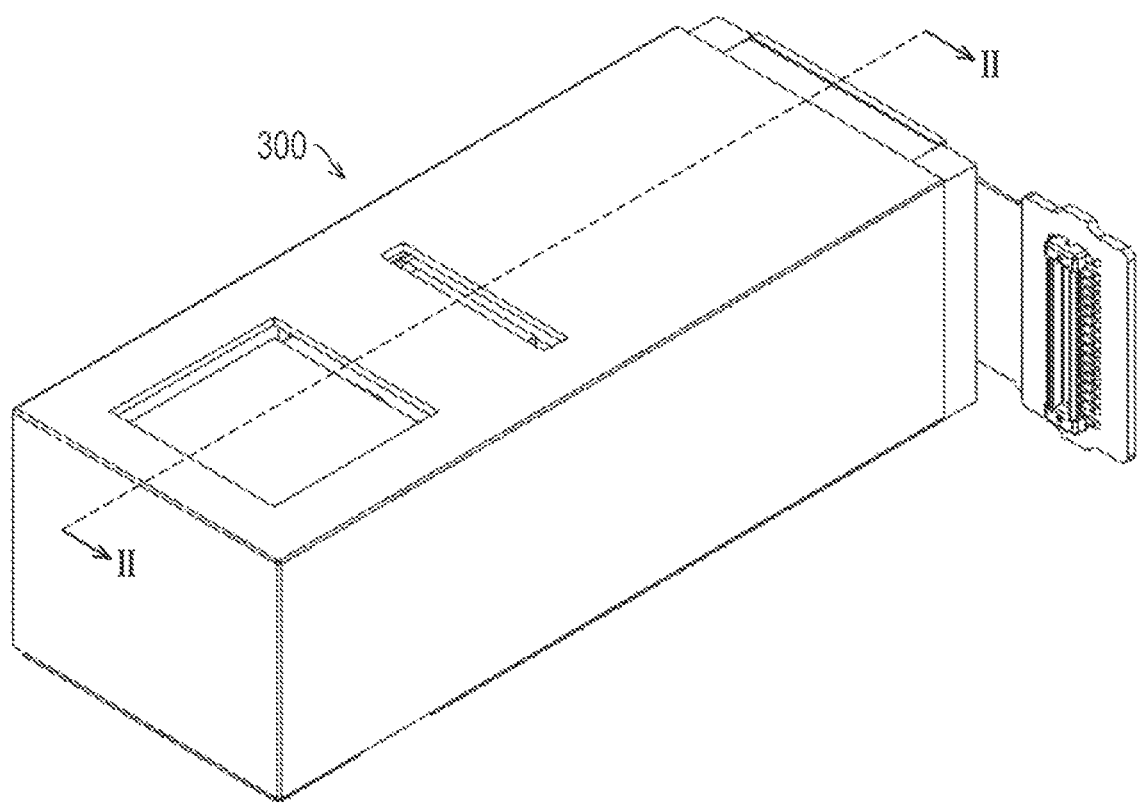
FIG. 1 is a perspective view of a camera module according to Embodiment 1.
Figure 2:
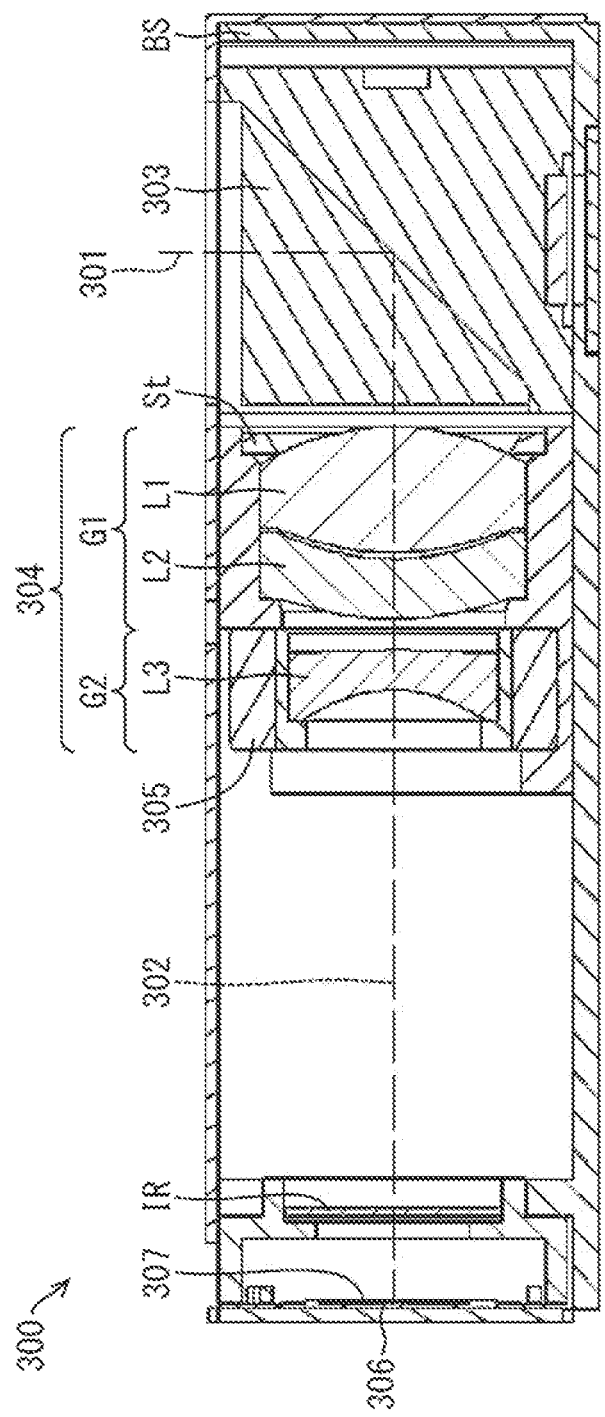
FIG. 2 is a cross-sectional view taken along an arrowed line II-II illustrated in FIG. 1.

An embodiment of the present disclosure is now described below in detail. FIG. 1 is a perspective view of a camera module 300 according to Embodiment 1. FIG. 2 is a cross-sectional view taken along an arrowed line II-II illustrated in FIG. 1. FIG. 2 represents a cross-section of the central portion of the camera module 300 taken along the optical axis.

The camera module 300 includes an optical system 304, and an imager 306. The imager 306 has an image plane 307 onto which object light is collected after passing through the optical system 304. The imager 306 performs photoelectric conversion on the object light.

The optical system 304 includes a first lens group G1, a second lens group G2, and a lens drive device 305. The first lens group G1 includes two or more lenses, and has positive power as a whole. The first lens group G1 receives object light. The second lens group G2 includes one or more lenses, and has negative power as a whole. The second lens group G2 is disposed rearward of the first lens group G1 to collect object light. The lens drive device 305 moves the second lens group G2 along a second optical axis 302.

The lens drive device 305 operates based on a voice coil motor (VCM) system.

The camera module 300 further includes a reflector element 303 disposed forward of the first lens group G1 of the optical system 304. The reflector element 303 bends object light emitted along a first optical axis 301, and directs the object light toward the optical system 304 along the second optical axis 302. The optical system 304 collects the object light onto the image plane 307 along the second optical axis 302.

The first lens group G1 and the imager 306 are fixed to a housing BS such that during focusing on a close-range object that emits object light, the distance between the first lens group G1 and the imager 306 along the second optical axis 302 does not change.

The first lens group G1 and the lens group G2 satisfy conditional expressions (1) to (5) below:

$$-6.0 < f/f2 < -2.0 \quad (1)$$

$$ih/f < 0.4 \quad (2)$$

$$0.7 < TTL/f < 1.0 \quad (3)$$

$$1.6 < Fno < 7.0 \quad (4)$$

$$De2 < De1, \quad (5)$$

where f represents the actual focal length of the first lens group G1 and the second lens group G2 as a whole, f2 represents the focal length of the second lens group G2, ih represents the maximum image height of the first lens group G1 and the second lens group G2 as a whole, TTL represents the distance to the image plane from the object-side surface of a lens of the first lens group G1 that is located closest to the object, Fno represents the F-number of the first lens group G1 and the second lens group G2 as a whole, De1 represents the optical effective diameter of the first lens group G1 as a whole, and De2 represents the optical effective diameter of the second lens group G2 as a whole.

The conditional expression (1) defines a desirable ratio of the focal length f2 of the second lens group G2 to the focal length f of the optical system 304. A value of the ratio below the lower limit, −6.0, of the conditional expression (1) may result in increased refracting power of the second lens group G2, which may lead to increased aberration fluctuations, in particular, fluctuations in the curvature of field and coma during focusing on a close-range object. A value of the ratio above the upper limit, −2.0, of the conditional expression (1) may result in decreased refracting power of the second lens group G2, which may result in increased amount of movement of the second lens group G2 during focusing on a close-range object.

The conditional expression (2) defines the 35 mm-equivalent focal length of the optical system 304. Satisfying this condition results in the optical system 304 having a 35 mm-equivalent focal length of greater than or equal to 50 mm, which makes it possible to achieve a zoom factor of greater than or substantially equal to 2 when the optical system 304 is used in combination with, for example, a camera having a 35 mm-equivalent focal length of 25 mm.

The conditional expression (3) defines the telephoto ratio of the optical system 304. A value of the telephoto ratio below the lower limit, 0.7, of the conditional expression (3) results in reduced size of the optical system 304 but increased aberrations, which leads to increased aberration fluctuations, in particular, fluctuations in the curvature of field during focusing on a close-range object. A value of the telephoto ratio above the upper limit, 1.0, of the conditional expression (3) may result in increased size of the optical system 304.

The conditional expression (4) defines the F-number of the optical system 304. A value of the F-number below the lower limit, 1.6, of the conditional expression (4) may result in increased thickness of the optical system 304, and also in increased spherical aberration or coma. A value of the F-number above the upper limit, 7.0, of the conditional expression (4) 7.0 may result in reduced amount of light that can be admitted into the optical system 304, and also in deteriorated resolution due to diffraction limit.

The conditional expression (5) defines the optical effective diameters of the first and second lens groups G1 and G2. Satisfying this condition allows for reduced size of the second lens group G2, which is a focusing lens group. This may facilitate miniaturization of the lens drive device 305.

The first lens group G1 includes a first lens L1 having positive power, and a second lens L2 having negative power. The second lens group G2 includes a third lens L3 having negative power.

Now, if a represents the distance to a close-range subject located at 5 cm to 1 m from the principal point of the first lens group G1 and the second lens group G2 as a whole, and d represents the driving distance that the second lens group G2 is to be driven for focusing from infinity to a subject located at the distance a, then the distance a, the driving distance d, and the focal length f2 satisfy expression (6) below:

$$a \times d/f^2 < 0.3 \, (50 < a < 1000). \quad (6)$$

As illustrated in FIG. 2, the camera module 300 according to Embodiment 1 includes the reflector element 303, the optical system 304, and the imager 306. The reflector element 303 is located closest to the subject. The reflector element 303 bends light emitted from a subject along the first optical axis 301, and directs the light along the second optical axis 302. The optical system 304 is disposed rearward of the reflector element 303. The imager 306 performs photoelectric conversion on light that has passed through the optical system 304.

The optical system 304 includes the first lens group G1, the second lens group G2, and the lens drive device 305. The first lens group G1 includes the first lens L1 located closest to the reflector element 303. The second lens group G2 is disposed rearward of the first lens group G1. The lens drive device 305 moves the second lens group G2 in a direction substantially aligned with the second optical axis 302.

The camera module 300 further includes an aperture stop St contained in the optical system 304, an infrared cut-off filter IR disposed forward of the imager 306, and the housing BS that directly or indirectly supports all of the components mentioned above.

The reflector element 303 bends a light beam travelling from the subject along the first optical axis 301, and directs the light beam along the second optical axis 302 for transmission to the optical system 304. In some embodiments, the angle at which the reflector element 303 bends the light beam, that is, the angle formed by the first optical axis 301 and the second optical axis 302 may be 90 degrees. It is to be noted, however, that the angle may be changed as appropriate, and is not limited to 90 degrees.

As for the reflector element 303, various reflecting materials such as a prism or a reflecting plate (mirror) may be used as appropriate. In some embodiments, among these reflecting materials, a prism may be used from the viewpoint of machining accuracy.

The reflector element 303 is supported by the housing BS of the camera module 300. Providing a drive mechanism between the reflector element 303 and the housing BS makes it possible to achieve an optical image stabilization function as will be described later.

The optical system 304 collects the light beam directed along the second optical axis 302 by the reflector element 303, onto the image plane 307 of the imager 306 to form an image.

The optical system 304 includes the first lens group G1, the second lens group G2, and the aperture stop St, and is supported by the housing BS. Providing a drive mechanism between the optical system 304 and the housing BS makes it possible to achieve an optical image stabilization function as will be described later.

As will be described above, various embodiments related to the optical performance of the camera module 300 according to embodiments of the present disclosure are implemented through the configurations of first to fifth lens L1 to L5 of the optical system 304.

The lens drive device 305 drives the second lens group G2 in a direction substantially aligned with the second optical axis 302 to thereby perform focusing.

As for the lens drive device 305, various devices are known, such as a device using a stepping motor, a device using a piezoelectric element, and a device using a VCM. Although the lens drive device 305 is not limited to any one of these devices, in some embodiments, among the devices mentioned above, the lens drive device 305 using a VCM may be used from the viewpoint of size, performance, price, and other factors.

The optical system 304 collects the light beam directed along the second optical axis 302 by the reflector element 303, onto the imager 306 to form an image.

The imager 306 is a sensor device capable of photoelectric conversion that converts a light beam collected onto the image plane 307 by the optical system 304 into an electrical signal. The electrical signal is subjected to software processing before being finally output as an image.

Providing a drive mechanism between the imager 306 and the housing BS makes it possible to achieve an optical image stabilization function as will be described later.

The infrared cut-off filter IR serves to cut off infrared light from light that is to become incident on the imager 306.

Foreign matter (dust or dirt) directly adhering to the imager 306 blocks collection of light, which may cause pronounced image degradation. Accordingly, by disposing the infrared cut-off filter IR forward of the imager 306, the infrared cut-off filter IR also serves to reduce the risk of foreign matter directly adhering to the imager 306.

In one example, the camera module 300 according to embodiments of the present disclosure may be configured to achieve optical image stabilization by causing the reflector element 303 to rotate about any two given axes of rotation.

The above-mentioned configuration includes a camera shake detector, a driver, a controller, and a holder. The camera shake detector is used to detect a camera shake condition. The driver is used to rotate the reflector element 303. The controller controls the driver based on a signal output from the shake detector. The holder holds the reflector element 303, and transmits the motion of the driver to thereby move the reflector element 303.

In another alternative example, the camera module 300 according to embodiments of the present disclosure may be configured to achieve optical image stabilization by causing the optical system 304 to move in parallel to any two given axes.

The above-mentioned configuration includes a camera shake detector, a driver, a controller, and a holder. The camera shake detector is used to detect a camera shake condition. The driver is used to move the optical system 304. The controller controls the driver based on a signal output from the shake detector. The holder holds the optical system 304, and transmits the motion of the driver to thereby move the optical system 304.

In still another alternative example, the camera module according to embodiments of the present disclosure may be configured to achieve optical image stabilization by causing the imager 306 to move in parallel to any two given axes.

The above-mentioned configuration includes a camera shake detector, a driver, a controller, and a holder. The camera shake detector is used to detect a camera shake condition. The driver is used to move the imager 306. The controller controls the driver based on a signal output from the shake detector. The holder holds the imager 306, and transmits the motion of the driver to thereby move the imager 306.

With all of the above-mentioned configurations, optical image stabilization is achieved by driving a component with respect to two axes. Accordingly, it is also possible to achieve optical image stabilization by using, for example, a combination of two axes with respect to each of which a separate component is driven, such that one axis serves as the axis of rotation of the reflector element 303 and the other axis serves as the axis of movement of the optical system 304.

Such configurations for achieving optical image stabilization are commonly known in the art and thus will be neither described nor illustrated in detail herein.

One embodiment related to the optical system 304 according to embodiments of the present disclosure is described below with reference to FIG. 3 and Table 1. Table 1 represents lens data according to Embodiment 1.

TABLE 1

| f = 23.3 mm (35 mm − equivalent f = 240 mm) | a = 500 mm |
| --- | --- |
| Fno = 4.4 | d = 0.14 mm |
| ω = 5.0 deg. | |
| ih = 2.050 mm | |
| TTL = 20.17 mm | |

| Surface Data (INF) | | | | |
| --- | --- | --- | --- | --- |
| Surface No. i | Curvature radius r (mm) | Surface separation t (mm) | Refractive index Nd | Abbe number vd |
| Subject | Infinity | Infinity | | |
| 1 (Stop) | Infinity | −0.639 | | |
| 2* | 5.705 | 2.900 | 1.497 | 81.56 |
| 3* | −5.930 | 0.135 | | |
| 4* | −5.516 | 1.391 | 1.821 | 24.06 |
| 5* | −6.986 | 0.734 | | |
| 6* | 19.205 | 0.895 | 1.597 | 81.56 |
| 7* | 2.899 | 11.817 | | |
| 8 | Infinity | 0.300 | 1.517 | 64.20 |
| 9 | Infinity | 2.000 | | |
| Image plane | Infinity | | | |

| Aspheric Surface Data | | | | | | |
| --- | --- | --- | --- | --- | --- | --- |
| | Surface 2 | Surface 3 | Surface 4 | Surface 5 | Surface 6 | Surface 7 |
| k | 0.000E+00 | 0.000E+00 | 0.000E+00 | 0.000E+00 | 0.000E+00 | 0.000E+00 |
| A4 | −2.092E−04 | 2.201E−03 | 1.137E−03 | 6.965E−04 | −7.633E−03 | −1.316E−02 |
| A6 | −9.473E−06 | −3.767E−05 | 5.083E−05 | 3.803E−05 | 1.253E−03 | 1.341E−03 |
| A8 | −2.189E−07 | 2.126E−06 | −6.176E−08 | −8.285E−07 | −1.116E−04 | −1.358E−04 |
| A10 | 0.000E+00 | 0.000E+00 | 0.000E+00 | 0.000E+00 | 4.111E−06 | −2.696E−06 |

In Table 1, f denotes the focal length of the optical system 304 as a whole, Fno denotes F-number, w denotes half the angle of view (in degrees), and ih denotes maximum image height. Further, i denotes surface number counted from the subject side, r denotes radius of curvature, t denotes the distance between lens surfaces on the optical axis, Nd denotes refractive index at the d-line, vd denotes Abbe number with respect to the d-line, and TTL denotes the distance to the imager 306 from the object-side surface of a lens of the first lens group G1 that is located closest to the reflector element 303. As for aspheric surfaces, an asterisk (*) is added after surface number i.

The aspheric shape used for an aspheric lens surface is given as equation (1) below:

$$z = \frac{\frac{h^2}{r}}{1 + \sqrt{1 - \frac{(1+k)h^2}{r^2}}} + A_4 h^4 + A_6 h^6 + A_8 h^8 + A_{10} h^{10} + A_{12} h^{12} + A_{14} h^{14} + A_{16} h^{16},$$

where z is the direction of the optical axis, h is the height in a direction orthogonal to the optical axis, k is conic constant, and $A_4$, $A_6$, $A_8$, and $A_{10}$ are aspheric coefficients. These definitions apply also to Tables 2 to 5 described later.

Figure 3:
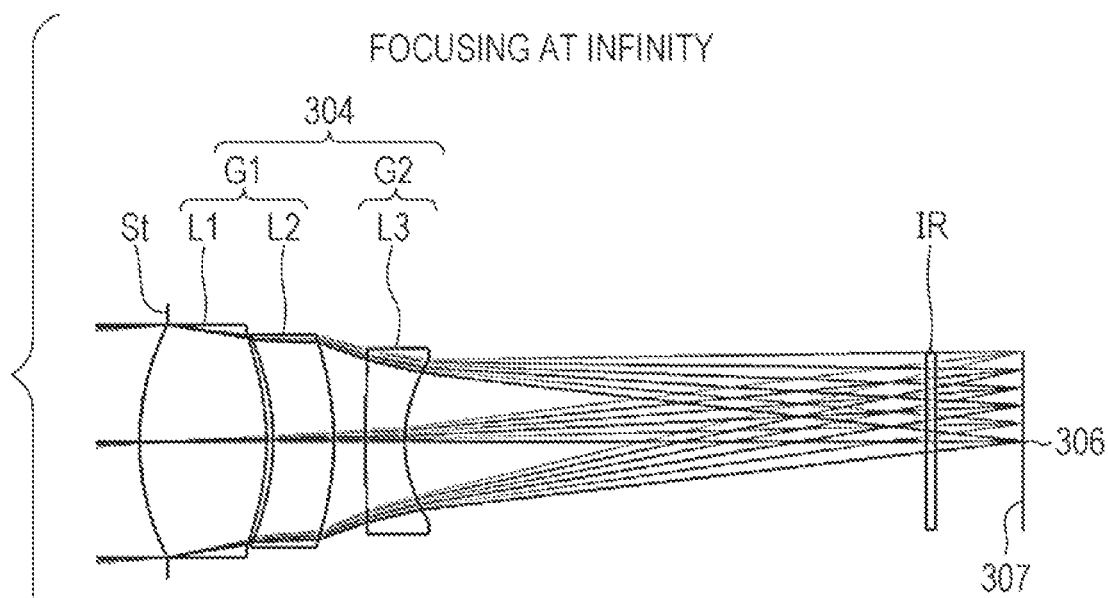
FIG. 3 illustrates the configuration of an optical part provided to the camera module.
Figure 3:
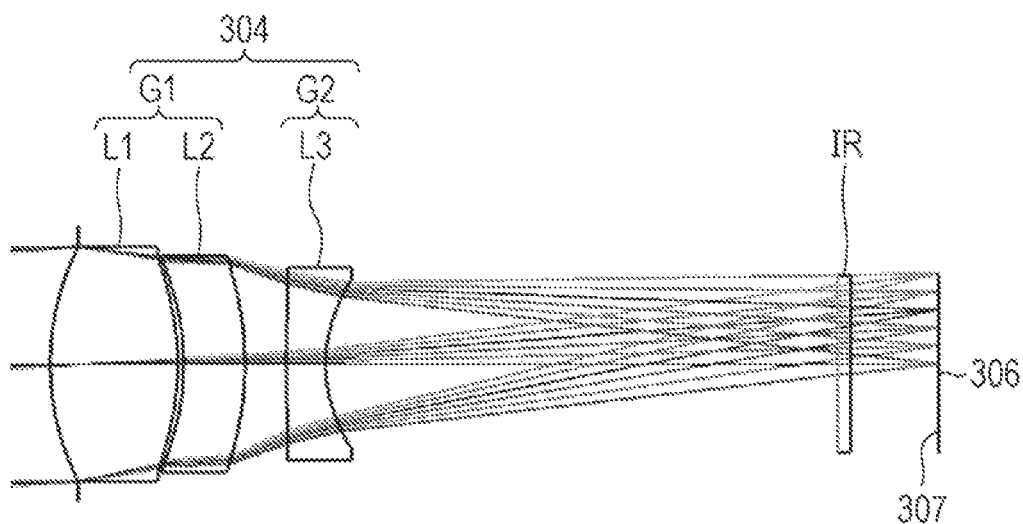

FIG. 3 illustrates a schematic configuration of the optical lens of the optical system 304 of the camera module 300 according to Embodiment 1. The optical lens includes the following elements arranged in the order stated below as viewed from the object: the aperture stop St; the first lens group G1 having positive power as a whole; and the second lens group G2 having negative power as a whole. The first lens group G1 includes the first lens L1 having positive power, and the second lens L2 having negative power. The second lens group G2 includes the third lens L3 having negative power.

With respect to Embodiment 1, lens data is presented in Table 1 above.

The optical lens according to Embodiment 1 has an actual focal length f of 23.3 mm, or a 35 mm-equivalent focal length of about 240 mm. If the wide-angle side of a dual lens camera has a 35 mm-equivalent focal length of 24 mm, then a zoom factor of about 10 can be achieved with the dual lens camera.

Now, it is assumed that f=23.3 mm, where f represents the actual focal length of the first lens group G1 and the second lens group G2 as a whole, f2=−7.00 mm, where f2 represents the focal length of the third lens L3 of the second lens group G2, ih=2.050 mm, where ih represents the maximum image height of the first lens group G1 and the second lens group G2 as a whole, TTL=20.17 mm, where TTL represents the distance to the image plane 307 from the object-side surface of the first lens L1 of the first lens group G1 that is located closest to the object, Fno=4.4, where Fno represents the F-number of the first lens group G1 and the second lens group G2 as a whole, De1=5.3 mm, where De1 represents the optical effective diameter of the first lens group G1 as a whole, and De2=4.4 mm, where De2 represents the optical effective diameter of the second lens group G2 as a whole.

Therefore, the first lens group G1 and the second lens group G2 according to Embodiment 1 satisfy conditional expressions (1) to (5) below:

$$-6.0 < f/f2 < -2.0 \quad (1)$$

$$ih/f < 0.4 \quad (2)$$

$$0.7 < TTL/f < 1.0 \tag{3}$$

$$1.6 < Fno < 7.0 \tag{4}$$

$$De2 < De1. \tag{5}$$

With the optical system 304 according to Embodiment 1, focusing can be achieved for shooting from infinity to close range by driving the third lens L3 toward the image. If a 1/4.4" sensor is used, the amount by which to shift the lens to perform focusing at a close-up shooting distance of 50 cm is 0.14 mm. By contrast, the amount by which to shift the lens to perform the same focusing with the unit-focusing system according to the related art, which shifts the entire lens as a unit, is 1.1 mm.

Embodiment 2

Reference is now made to other embodiments of the present disclosure. For the convenience of explanation, components identical in function to the components described above with reference to Embodiment 1 are designated by the same reference signs and their descriptions are not repeated.

Figure 4:
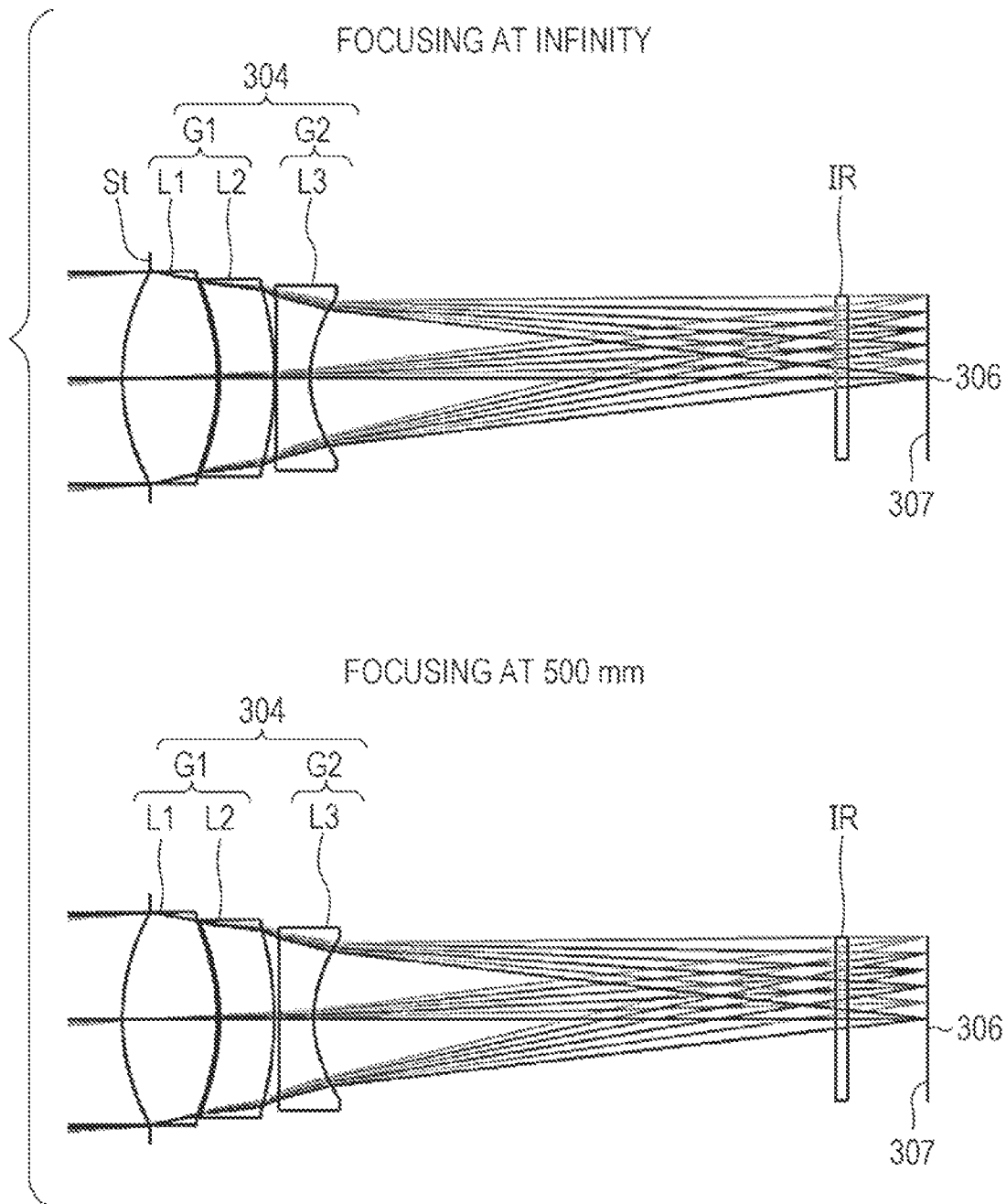
FIG. 4 illustrates the configuration of an optical part provided to a camera module according to Embodiment 2.

FIG. 4 illustrates the configuration of an optical system 304 provided to a camera module according to Embodiment 2. A first lens group G1 and a second lens group G2 of the optical system 304 are similar in configuration to those according to Embodiment 1.

camera has a 35 mm-equivalent focal length of 24 mm, then a zoom factor of about 10.2 can be achieved with the dual lens camera.

Now, it is assumed that f=23.4 mm, where f represents the actual focal length of the first lens group G1 and the second lens group G2 as a whole, f2=−5.77 mm, where f2 represents the focal length of the third lens L3 of the second lens group G2, ih=2.050 mm, where ih represents the maximum image height of the first lens group G1 and the second lens group G2 as a whole, TTL=20.11 mm, where TTL represents the distance to the image plane 307 from the object-side surface of the first lens L1 of the first lens group G1 that is located closest to the object, Fno=4.4, where Fno represents the F-number of the first lens group G1 and the second lens group G2 as a whole, De1=5.3 mm, where De1 represents the optical effective diameter of the first lens group G1 as a whole, and De2=4.6 mm, where De2 represents the optical effective diameter of the second lens group G2 as a whole.

Therefore, the first lens group G1 and the second lens group G2 according to Embodiment 2 satisfy conditional expressions (1) to (5) below:

$$-6.0 < f/f2 < -2.0 \tag{1}$$

$$ih/f < 0.4 \tag{2}$$

TABLE 2

| f = 23.4 mm (35 mm − equivalent f = 245mm) | a = 500 mm |
| Fno = 4.4 | d = 0.09 mm |
| ω = 4.9 deg. | |
| lh = 2.050 mm | |
| TTL = 20.11 mm | |

| Surface Data (INF) | | | | |
| --- | --- | --- | --- | --- |
| Surface No. i | Curvature radius r (mm) | Surface separation t (mm) | Refractive index Nd | Abbe number νd |
| Subject | Infinity | Infinity | | |
| 1 (Stop) | Infinity | −0.694 | | |
| 2* | 5.343 | 2.372 | 1.544 | 55.93 |
| 3* | −5.184 | 0.059 | | |
| 4* | −5.764 | 1.361 | 1.650 | 21.53 |
| 5* | −8.227 | 0.048 | | |
| 6* | 47.217 | 0.851 | 1.544 | 55.93 |
| 7* | 2.924 | 13.119 | | |
| 8 | Infinity | 0.300 | 1.517 | 64.20 |
| 9 | Infinity | 2.000 | | |
| Image plane | Infinity | | | |

| Aspheric Surface Data | | | | | | |
| --- | --- | --- | --- | --- | --- | --- |
| | Surface 2 | Surface 3 | Surface 4 | Surface 5 | Surface 6 | Surface 7 |
| k | 0.000E+00 | 0.000E+00 | 0.000E+00 | 0.000E+00 | 0.000E+00 | 0.000E+00 |
| A4 | −1.736E−04 | 3.285E−03 | 1.806E−04 | −3.758E−04 | −6.854E−03 | −1.237E−02 |
| A6 | 8.428E−06 | −6.316E−05 | 1.274E−04 | 1.392E−04 | 1.167E−03 | 1.175E−03 |
| A8 | −1.411E−06 | 3.193E−06 | −2.031E−06 | −3.854E−06 | −9.539E−05 | −7.002E−05 |
| A10 | 0.000E+00 | 0.000E+00 | 0.000E+00 | 0.000E+00 | 3.052E−06 | −8.449E−06 |

Table 2 above presents lens data for an optical lens provided to the optical system 304 of the camera module according to Embodiment 2.

The optical lens according to Embodiment 2 has an actual focal length f of 23.4 mm, or a 35 mm-equivalent focal length of about 245 mm. If the wide-angle side of a dual lens $$0.7 < TTL/f < 1.0 \tag{3}$$

$$1.6 < Fno < 7.0 \tag{4}$$

$$De2 < De1. \tag{5}$$

With the optical lens according to Embodiment 2, focusing can be achieved for shooting from infinity to close range by driving the third lens L3 toward the image. If a 1/4.4" sensor is used, the amount by which to shift the lens to perform focusing at a close-up shooting distance of 50 cm is 0.09 mm. By contrast, the amount by which to shift the lens to perform the same focusing with the unit-focusing system according to the related art, which shifts the entire lens as a unit, is 1.0 mm.

Embodiment 3

Figure 5:
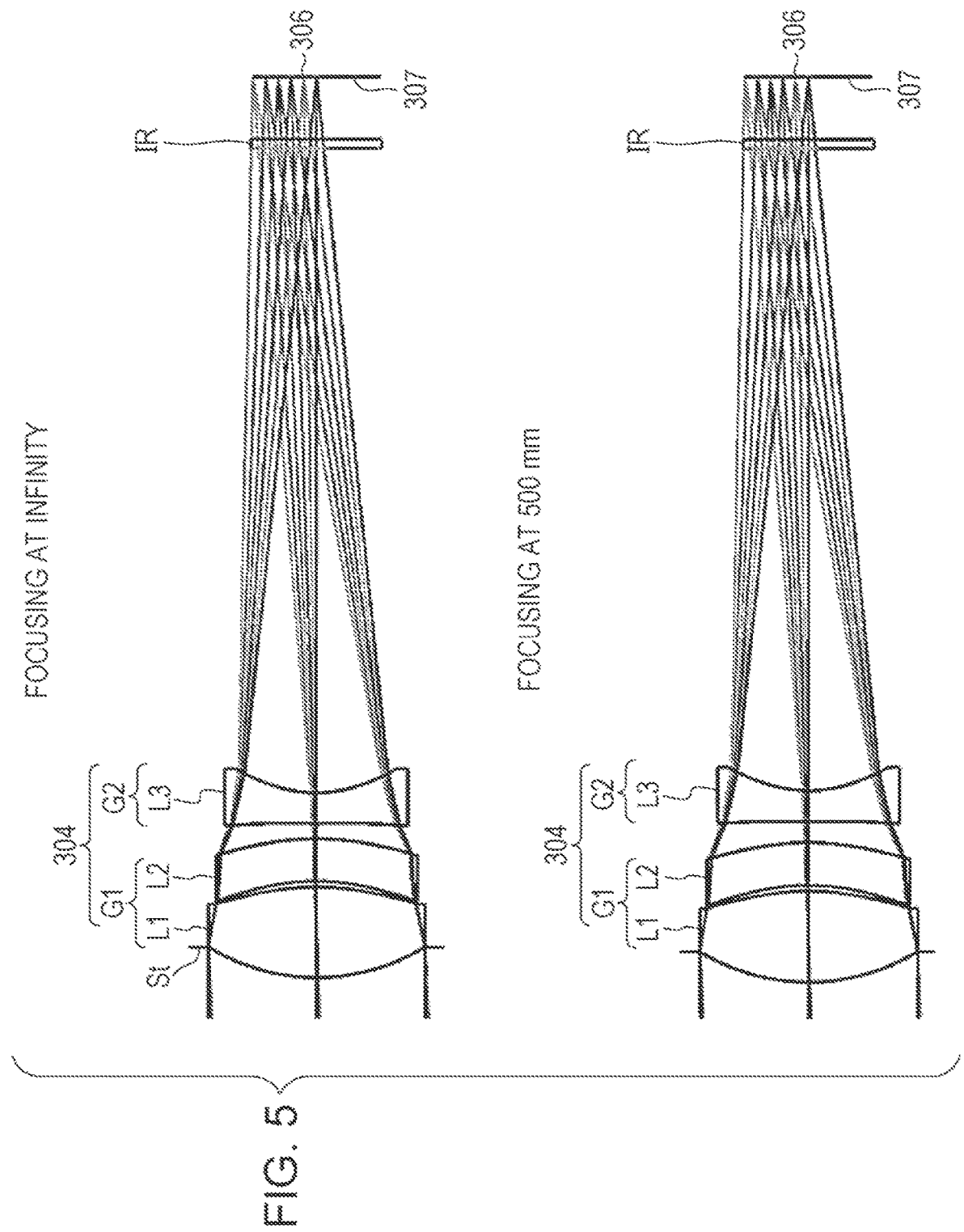
FIG. 5 illustrates the configuration of an optical part provided to a camera module according to Embodiment 3.

FIG. 5 illustrates the configuration of an optical system 304 provided to a camera module according to Embodiment 3. A first lens group G1 and a second lens group G2 of the optical system 304 are similar in configuration to those according to Embodiment 1.

TABLE 3 f = 34.2 mm (35 mm – equivalent f = 360 mm)  a = 500 mm
Fno = 4.9                                    d = 0.18 mm
ω = 3.4 deg.
lh = 2.050 mm
TTL = 29.19 mm Surface Data (INF)

| Surface No. i | Curvature radius r (mm) | Surface separation t (mm) | Refractive index Nd | Abbe number νd |
|---|---|---|---|---|
| Subject | Infinity | Infinity | | |
| 1 (Stop) | Infinity | −0.987 | | |
| 2* | 6.600 | 2.936 | 1.497 | 81.56 |
| 3* | −7.839 | 0.181 | | |
| 4* | −6.849 | 1.389 | 1.821 | 24.06 |
| 5* | −8.349 | 0.490 | | |
| 6* | 45.163 | 0.996 | 1.597 | 81.56 |
| 7* | 3.794 | 20.895 | | |
| 8 | Infinity | 0.300 | 1.517 | 64.20 |
| 9 | Infinity | 2.000 | | |
| Image plane | Infinity | | | |

Aspheric Surface Data

| | Surface 2 | Surface 3 | Surface 4 | Surface 5 | Surface 6 | Surface 7 |
|---|---|---|---|---|---|---|
| k | 0.000E+00 | 0.000E+00 | 0.000E+00 | 0.000E+00 | 0.000E+00 | 0.000E+00 |
| A4 | −8.826E−05 | 1.673E−03 | 1.560E−03 | 1.083E−03 | −5.234E−03 | −8.307E−03 |
| A6 | 5.042E−06 | −2.896E−05 | −8.054E−06 | −1.872E−07 | 5.556E−04 | 5.883E−04 |
| A8 | −5.788E−07 | 1.763E−07 | 7.270E−09 | −2.018E−07 | −2.745E−05 | −1.985E−05 |
| A10 | 0.000E+00 | 0.000E+00 | 0.000E+00 | 0.000E+00 | 5.165E−07 | −9.871E−07 |

Table 3 above presents lens data for an optical lens provided to the optical system 304 of the camera module according to Embodiment 3.

The optical lens according to Embodiment 3 has an actual focal length f of 34.2 mm, or a 35 mm-equivalent focal length of about 360 mm. If the wide-angle side of a dual lens camera has a 35 mm-equivalent focal length of 24 mm, then a zoom factor of about 15 can be achieved with the dual lens camera.

Now, it is assumed that f=34.2 mm, where f represents the actual focal length of the first lens group G1 and the second lens group G2 as a whole, f2=−8.40 mm, where f2 represents the focal length of the third lens L3 of the second lens group G2, ih=2.050 mm, where ih represents the maximum image height of the first lens group G1 and the second lens group G2 as a whole, TTL=29.19 mm, where TTL represents the distance to the image plane 307 from the object-side surface of the first lens L1 of the first lens group G1 that is located closest to the object, Fno=4.9, where Fno represents the F-number of the first lens group G1 and the second lens group G2 as a whole, De1=7.0 mm, where De1 represents the optical effective diameter of the first lens group G1 as a whole, and De2=5.7 mm, where De2 represents the optical effective diameter of the second lens group G2 as a whole.

Therefore, the first lens group G1 and the second lens group G2 according to Embodiment 3 satisfy conditional expressions (1) to (5) below:

$$-6.0 < f/f2 < -2.0 \tag{1}$$

$$ih/f < 0.4 \tag{2}$$

$$0.7 < TTL/f < 1.0 \tag{3}$$

$$1.6 < Fno < 7.0 \tag{4}$$

$$De2 < De1. \tag{5}$$

With the optical lens according to Embodiment 3, focusing can be achieved for shooting from infinity to close range by driving the third lens L3 toward the image. If a 1/4.4" sensor is used, the amount by which to shift the lens to perform focusing at a close-up shooting distance of 50 cm is 0.18 mm. By contrast, the amount by which to shift the lens to perform the same focusing with the unit-focusing system according to the related art, which shifts the entire lens as a unit, is 2.5 mm.

Embodiment 4

Figure 6:
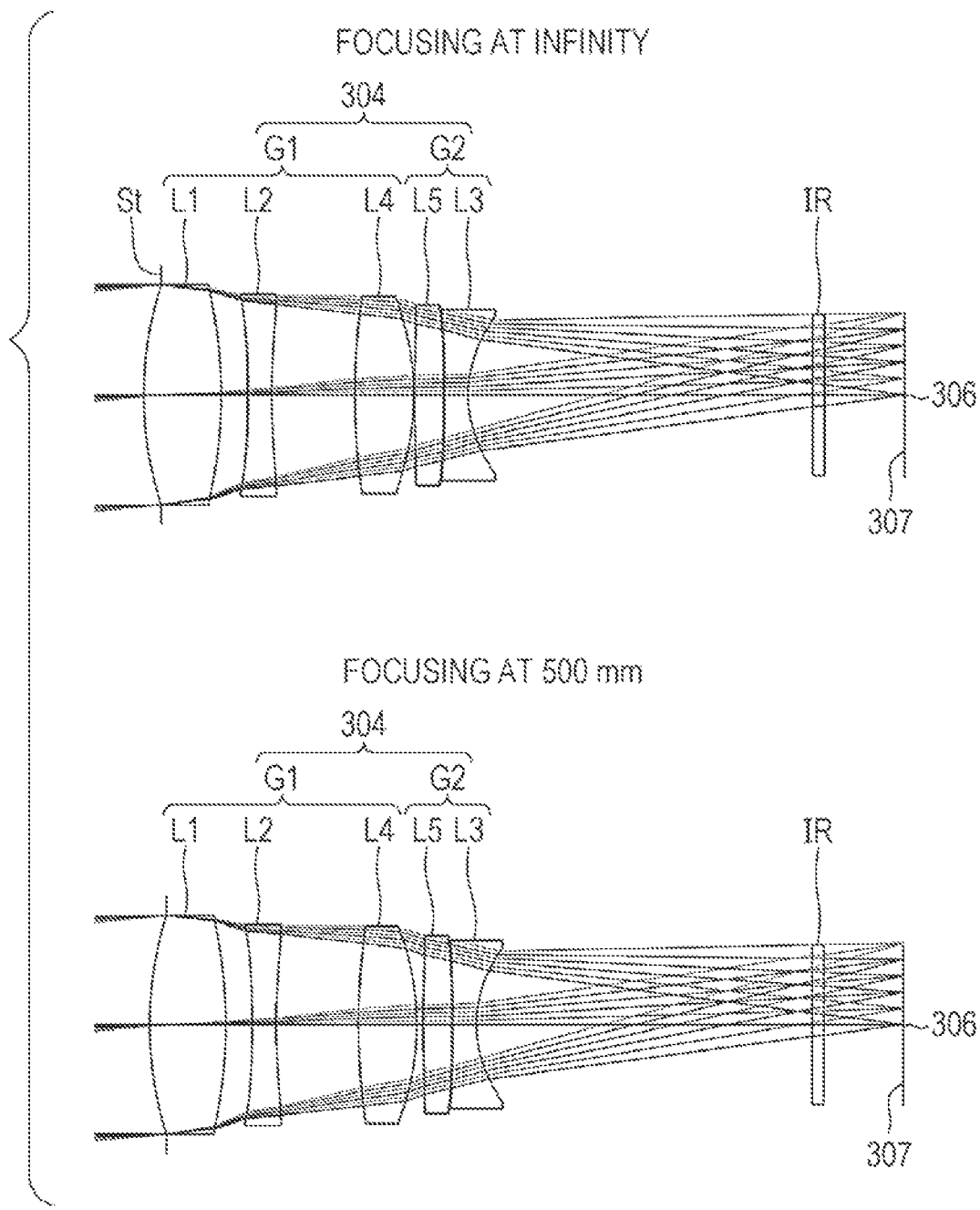
FIG. 6 illustrates the configuration of an optical part provided to a camera module according to Embodiment 4.

FIG. 6 illustrates the configuration of an optical system 304 provided to a camera module according to Embodiment 4. The optical system 304 includes the following components each arranged in the stated order from the object side: a stop St; a first lens group G1 having positive power as a whole; and a second lens group G2 having negative power as a whole. The first lens group G1 includes a first lens L1 having positive power, a second lens L2 having negative power, and a fourth lens L4 having positive power. The second lens group G2 includes a fifth lens L5 having positive power, and a third lens L3 having negative power.

TABLE 4

| f = 20.9 mm (35 mm – equivalent f = 220 mm) | a = 500 mm |
| Fno = 3.8 | d = 0.14 mm |
| ω = 5.5 deg. | |
| ih = 2.050 mm | |
| TTL = 19.00 mm | |

Surface Data (INF)

| Surface No. i | Curvature radius r (mm) | Surface separation t (mm) | Refractive index Nd | Abbe number νd |
|---|---|---|---|---|
| Subject | Infinity | Infinity | | |
| 1 (Stop) | Infinity | −0.433 | | |
| 2* | 9.130 | 1.930 | 1.544 | 55.93 |
| 3* | −10.975 | 0.664 | | |
| 4* | −32.819 | 0.600 | 1.650 | 21.53 |
| 5* | −16.107 | 2.085 | | |
| 6* | 20.567 | 1.465 | 1.535 | 55.69 |
| 7* | −6.318 | 0.020 | | |
| 8* | 29.811 | 0.719 | 1.650 | 21.53 |
| 9* | Infinity | 0.020 | | |
| 10* | Infinity | 0.600 | 1.535 | 55.69 |
| 11* | 2.937 | 8.595 | | |
| 12 | Infinity | 0.300 | 1.517 | 64.20 |
| 13 | Infinity | 2.000 | | |
| Image plane | Infinity | | | |

Aspheric Surface Data

| | Surface 2 | Surface 3 | Surface 4 | Surface 5 | Surface 6 |
|---|---|---|---|---|---|
| k | 0.000E+00 | 0.000E+00 | 0.000E+00 | 0.000E+00 | 0.000E+00 |
| A4 | 5.550E−05 | 6.879E−04 | −2.273E−03 | −1.505E−03 | 1.695E−03 |
| A6 | 1.083E−05 | −1.332E−05 | −2.128E−05 | −5.910E−05 | −3.463E−04 |
| A8 | 4.602E−07 | −2.329E−07 | 1.469E−06 | 6.305E−06 | 2.015E−05 |
| A10 | 0.000E+00 | 1.737E−08 | 0.000E+00 | 2.684E−07 | 1.002E−06 |
| A12 | 0.000E+00 | 0.000E+00 | 0.000E+00 | −2.698E−08 | 5.825E−08 |
| A14 | 0.000E+00 | 0.000E+00 | 0.000E+00 | 0.000E+00 | −2.268E−08 |
| A16 | 0.000E+00 | 0.000E+00 | 0.000E+00 | 0.000E+00 | 1.166E−09 |

| | Surface 7 | Surface 8 | Surface 9 | Surface 10 | Surface 11 |
|---|---|---|---|---|---|
| k | 0.000E+00 | 0.000E+00 | 0.000E+00 | 0.000E+00 | 0.000E+00 |
| A4 | 3.000E−03 | −2.931E−03 | −9.353E−03 | −8.445E−03 | −5.170E−03 |
| A6 | −7.545E−04 | 4.908E−05 | 2.267E−03 | 2.162E−03 | −4.524E−04 |
| A8 | 1.200E−04 | 5.252E−05 | −4.047E−04 | −2.287E−04 | 6.100E−04 |
| A10 | −9.113E−06 | −1.186E−05 | 5.201E−05 | −2.424E−05 | −2.744E−04 |
| A12 | 3.090E−07 | 2.001E−06 | −4.413E−06 | 8.025E−06 | 4.767E−05 |
| A14 | 3.444E−10 | −1.864E−07 | 1.669E−07 | −8.110E−07 | −3.795E−06 |
| A16 | 0.000E+00 | 6.804E−09 | −1.147E−09 | 3.110E−08 | 1.153E−07 |

Table 4 above presents lens data for an optical lens provided to the optical system 304 of the camera module according to Embodiment 4.

The optical lens according to Embodiment 4 has an actual focal length f of 20.9 mm, or a 35 mm-equivalent focal length of about 220 mm. If the wide-angle side of a dual lens camera has a 35 mm-equivalent focal length of 24 mm, then a zoom factor of about 9.2 can be achieved with the dual lens camera.

Now, it is assumed that f=20.9 mm, where f represents the actual focal length of the first lens group G1 and the second lens group G2 as a whole, f2=−6.37 mm, where f2 represents the focal length of the third lens L3 of the second lens group G2, ih=2.050 mm, where ih represents the maximum image height of the first lens group G1 and the second lens group G2 as a whole, TTL=19.00 mm, where TTL represents the distance to the image plane 307 from the object-side surface of the first lens L1 of the first lens group G1 that is located closest to the object, Fno=3.8, where Fno represents the F-number of the first lens group G1 and the second lens group G2 as a whole, De1=5.5 mm, where De1 represents the optical effective diameter of the first lens group G1 as a whole, and De2=4.3 mm, where De2 represents the optical effective diameter of the second lens group G2 as a whole.

Therefore, the first lens group G1 and the second lens group G2 according to Embodiment 4 satisfy conditional expressions (1) to (5) below:

$$-6.0 < f/f2 < -2.0 \qquad (1)$$

$$ih/f < 0.4 \qquad (2)$$

$$0.7 < TTL/f < 1.0 \qquad (3)$$

$1.6 < Fno < 7.0$ (4)

$De2 < De1.$ (5)

With the optical lens according to Embodiment 4, focusing can be achieved for shooting from infinity to close range by driving the second lens group G2 toward the image. If a 1/4.4" sensor is used, the amount by which to shift the lens to perform focusing at a close-up shooting distance of 50 cm is 0.14 mm. By contrast, the amount by which to shift the lens to perform the same focusing with the unit-focusing system according to the related art, which shifts the entire lens as a unit, is 0.92 mm.

Embodiment 5

Figure 7:
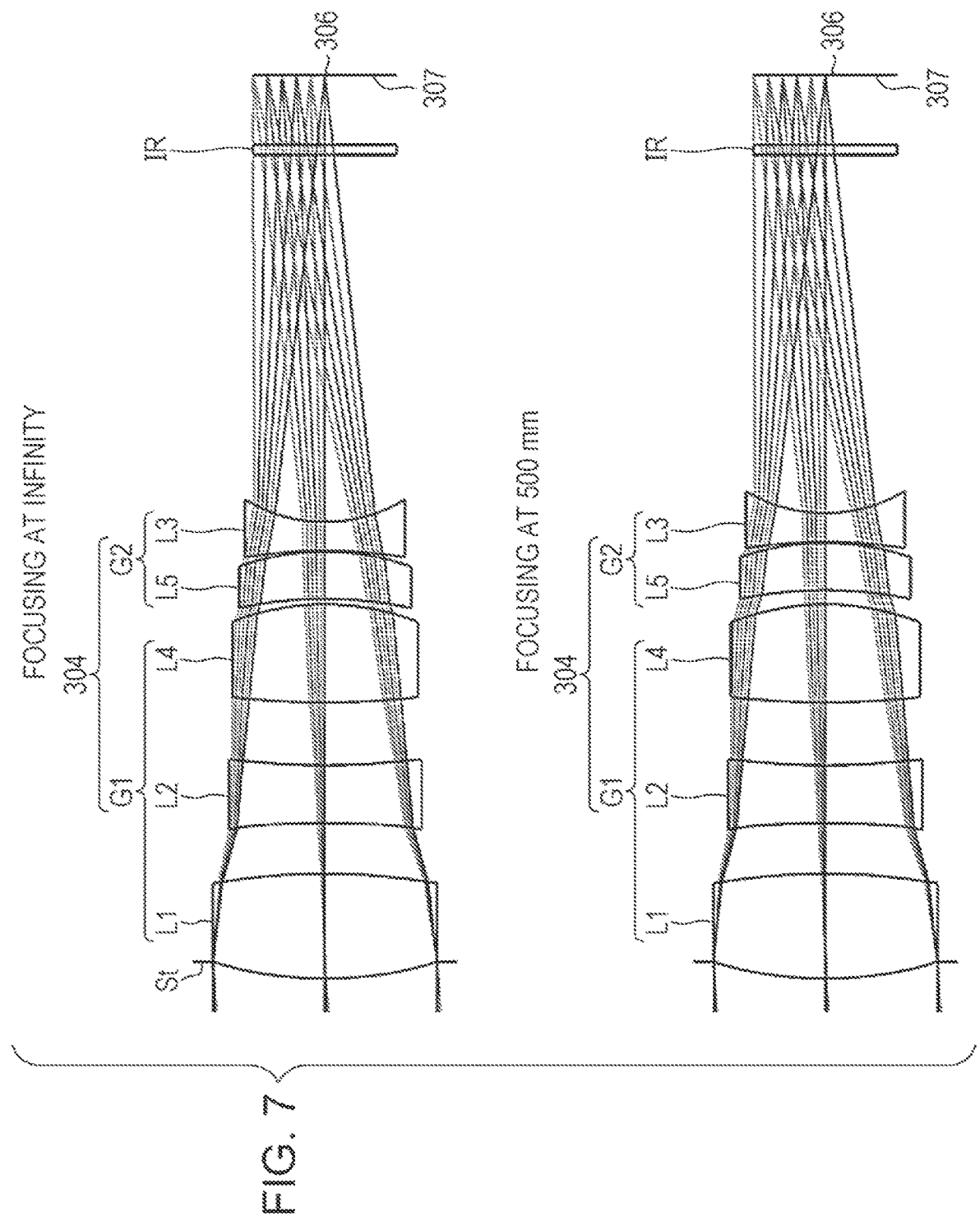
FIG. 7 illustrates the configuration of an optical part provided to a camera module according to Embodiment 5.

FIG. 7 illustrates the configuration of an optical system 304 provided to a camera module according to Embodiment 5. A first lens group G1 and a second lens group G2 of the optical system 304 are similar in configuration to those according to Embodiment 4.

TABLE 5 f = 28.2 mm (35 mm – equivalent f = 300 mm)   a = 500 mm
Fno = 4.4                                      d = 0.25 mm
ω = 4.1 deg.
Ih = 2.050 mm
TTL = 25.88 mm

| | | Surface Data (INF) | | |
|---|---|---|---|---|
| Surface No. i | Curvature radius r (mm) | Surface separation t (mm) | Refractive index Nd | Abbe number vd |
| Subject | Infinity | Infinity | | |
| 1 (Stop) | Infinity | −0.485 | | |
| 2* | 11.360 | 3.000 | 1.544 | 55.93 |
| 3* | −17.655 | 1.453 | | |
| 4* | −50.473 | 1.660 | 1.650 | 21.53 |
| 5* | 16.752 | 1.800 | | |
| 6* | 25.575 | 2.824 | 1.535 | 55.69 |
| 7* | −6.783 | 0.150 | | |
| 8* | −12.136 | 1.335 | 1.650 | 21.53 |
| 9* | −7.813 | 0.030 | | |
| 10* | −14.778 | 0.822 | 1.535 | 55.69 |
| 11* | 4.414 | 10.510 | | |
| 12 | Infinity | 0.300 | 1.517 | 64.20 |
| 13 | Infinity | 2.000 | | |
| Image plane | Infinity | | | |

| | | Aspheric Surface Data | | |
|---|---|---|---|---|
| | Surface 2 | Surface 3 | Surface 4 | Surface 5 | Surface 6 |
| k | 0.000E+00 | 0.000E+00 | 0.000E+00 | 0.000E+00 | 0.000E+00 |
| A4 | 1.977E−04 | 2.213E−04 | −1.570E−03 | −9.404E−04 | 4.302E−04 |
| A6 | 4.230E−06 | −2.304E−06 | −1.751E−05 | −1.275E−05 | −3.136E−05 |
| A8 | 0.000E+00 | 0.000E+00 | 1.241E−06 | 1.475E−06 | 0.000E+00 |
| A10 | 0.000E+00 | 0.000E+00 | 0.000E+00 | 0.000E+00 | 0.000E+00 |
| | Surface 7 | Surface 8 | Surface 9 | Surface 10 | Surface 11 |
| k | 0.000E+00 | 0.000E+00 | 0.000E+00 | 0.000E+00 | 0.000E+00 |
| A4 | 8.809E−04 | −1.094E−04 | −2.198E−03 | −2.414E−03 | 3.584E−04 |
| A6 | −1.951E−05 | −4.476E−05 | 4.790E−04 | 6.320E−04 | −5.577E−05 |
| A8 | 0.000E+00 | 7.647E−07 | −3.889E−05 | −3.910E−05 | 4.458E−05 |
| A10 | 0.000E+00 | 9.472E−08 | 1.121E−06 | −5.745E−08 | −7.033E−06 |

Table 5 above presents lens data for an optical lens provided to the optical system 304 of the camera module according to Embodiment 5.

The optical lens according to Embodiment 5 has an actual focal length f of 28.2 mm, or a 35 mm-equivalent focal length of about 300 mm. If the wide-angle side of a dual lens camera has a 35 mm-equivalent focal length of 24 mm, then a zoom factor of about 12.5 can be achieved with the dual lens camera.

Now, it is assumed that f=28.2 mm, where f represents the actual focal length of the first lens group G1 and the second lens group G2 as a whole, f2=−7.63 mm, where f2 represents the focal length of the third lens L3 of the second lens group G2, ih=2.050 mm, where ih represents the maximum image height of the first lens group G1 and the second lens group G2 as a whole, TTL=25.88 mm, where TTL represents the distance to the image plane 307 from the object-side surface of the first lens L1 of the first lens group G1 that is located closest to the object, Fno=4.4, where Fno represents the F-number of the first lens group G1 and the second lens group G2 as a whole, De1=6.4 mm, where De1 represents the optical effective diameter of the first lens group G1 as a whole, and De2=4.9 mm, where De2 represents the optical effective diameter of the second lens group G2 as a whole.

Therefore, the first lens group G1 and the second lens group G2 according to Embodiment 3 satisfy conditional expressions (1) to (5) below:

$$-6.0 < f/f2 < -2.0 \quad (1)$$

$$ih/f < 0.4 \quad (2)$$

$$0.7 < TTL/f < 1.0 \quad (3)$$

$$1.6 < Fno < 7.0 \quad (4)$$

$$De2 < De1. \quad (5)$$

With the optical lens according to Embodiment 5, focusing can be achieved for shooting from infinity to close range by driving the second lens group G2 toward the image. If a 1/4.4" sensor is used, the amount by which to shift the lens to perform focusing at a close-up shooting distance of 50 cm is 0.25 mm. By contrast, the amount by which to shift the lens to perform the same focusing with the unit-focusing system according to the related art, which shifts the entire lens as a unit, is 1.7 mm.

COMPARATIVE EXAMPLES

Figure 8:
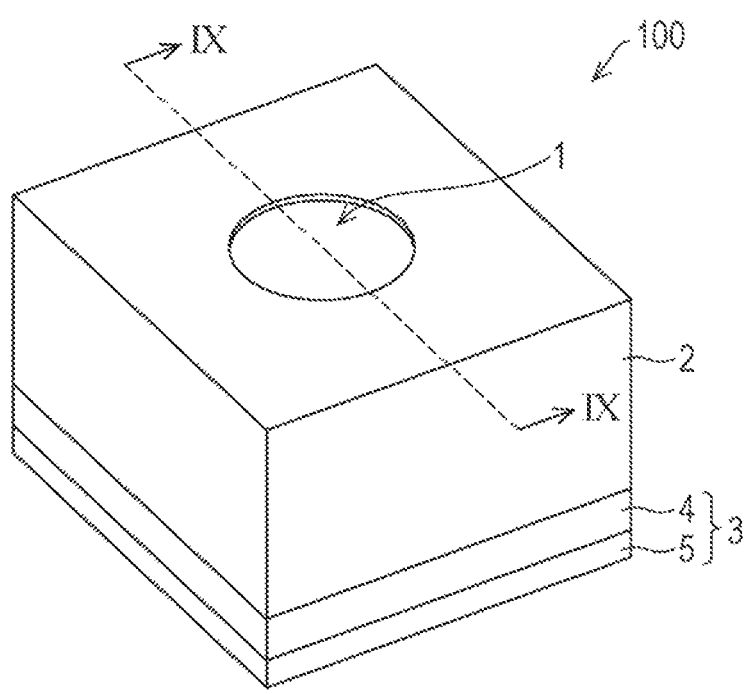
FIG. 8 is a perspective view of a camera module according to a comparative example.

FIG. 8 is a perspective view of a camera module 100 according to a comparative example. The camera module 100 is a straight-type camera module described in Japanese Patent No. 5611533. The camera module 100 includes an optical part 1 serving as an imaging optical system, a lens drive device 2 that drives the optical part 1, and an imager 3 that performs photoelectric conversion on light that has passed through the optical part 1. The optical part 1 is held inside the lens drive device 2. The imager 3 includes a sensor part 4, and a substrate 5 on which the sensor part 4 is mounted. The camera module 100 includes the sensor part 4 and the lens drive device 2 that are stacked in this order over the substrate 5 in the direction of the optical axis. In the following description, for convenience, a portion of the camera module 100 near the optical part 1 will be defined as upper portion, and a portion of the camera module 100 near the imager 3 will be defined as lower portion.

Figure 9:
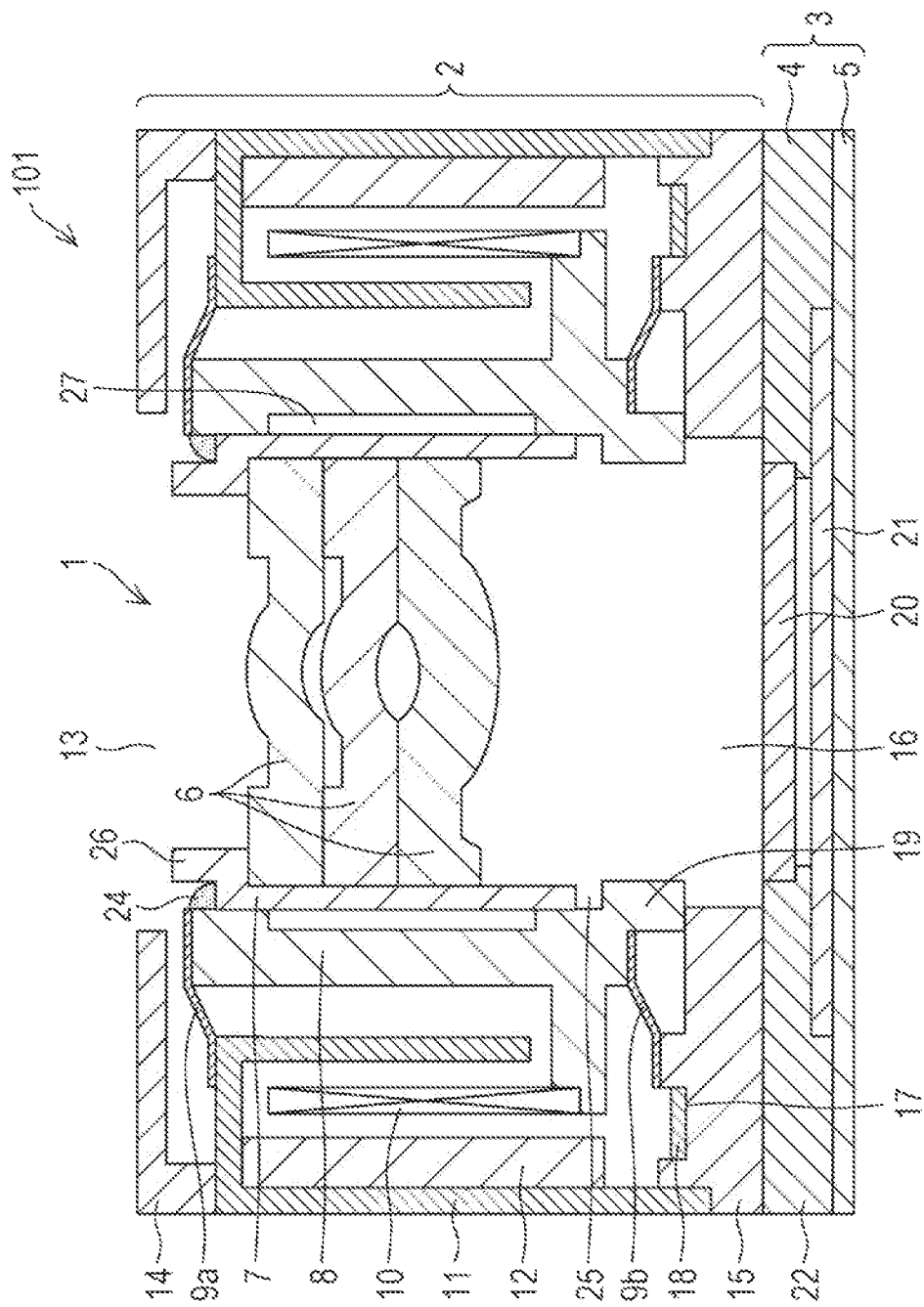
FIG. 9 is a cross-sectional view taken along an arrowed line IX-IX illustrated in FIG. 8.

FIG. 9 is a cross-sectional view taken along an arrowed line IX-IX illustrated in FIG. 8. First, the general structure of the camera module 100 is described below with reference to FIG. 9. FIG. 9 represents a cross-section of the central portion of the camera module 100 taken along the optical axis.

The optical part 1 is an imaging optical system that forms a subject image. The optical part 1 guides external light toward the sensor part 4 of the imager 3. The optical part 1 includes multiple (three in FIG. 9) imaging lenses 6, and a lens barrel 7 that holds the imaging lenses 6. The lens barrel 7 is fixed to the lens drive device 2. The optical axis of the imaging lenses 6 aligns with the axial center of the lens barrel 7.

The camera module 100 is equipped with the lens drive device 2 of a voice coil motor (VCM) type. The lens drive device 2 drives the optical part 1 in the direction of the optical axis by means of an electromagnetic force. That is, the lens drive device 2 causes the imaging lenses 6 to move up and down between the infinity end and the macro end. Autofocusing is thus effected by the camera module 100. Such a system that shifts the lens barrel 7 holding the whole set of imaging lenses 6 as a unit is called a unit-focusing system.

The lens drive device 2 includes a movable part, and a stationary part. The movable part is a part that, during driving of the imaging lenses 6, moves in the direction of the optical axis to thereby move the optical part 1 (imaging lenses 6) in the direction of the optical axis. The stationary part is a part whose position does not change as the imaging lenses 6 are driven. The movable part is accommodated inside the stationary part. The movable part includes a lens holder 8, and a coil 10. The stationary part includes a yoke 11, a permanent magnet 12, a cover 14, and a base 15.

The coil 10 is fixed to the outer periphery end portion (flange) of the lens holder 8. The coil 10 is disposed to extend from the outer periphery end portion (bottom) of the lens holder 8 toward the light incidence side (toward an opening 13 described later).

The base 15 defines the bottom portion of the lens drive device 2. The sensor part 4 is disposed on the back of the base 15. The base 15 has an opening 16 formed in the central portion to provide an optical path.

The yoke 11 is a tubular component, and defines the lateral portion of the lens drive device 2. The yoke 11 accommodates the movable part therein. The yoke 11 is fixed on the base 15. The cover 14 is disposed above the yoke 11. The cover 14 defines an upper portion (top surface) of the lens drive device 2.

A magnetic circuit including the permanent magnet 12 is disposed on the inner surface of the yoke 11 so as to face the coil 10.

The lens drive device 2 drives the imaging lenses 6 in the direction of the optical axis by means of an electromagnetic force generated by the coil 10 and the permanent magnet 12. More specifically, the imaging lenses 6 (lens holder 8) can be moved in the direction of the optical axis by means of a force generated by current passed through the coil 10 located within a magnetic field produced by the permanent magnet 12.

In the lens drive device 2, leaf springs 9a and 9b are respectively disposed on the upper and lower surfaces (top and bottom surfaces) of the lens holder 8. The leaf springs 9a and 9b press the lens holder 8 in the direction of the optical axis. That is, the elastic force of the leaf springs 9a and 9b serves to provide auxiliary support to the lens holder 8 in a manner that allows movement in the direction of the optical axis. The leaf springs 9a and 9b each have a spiral pattern. Each of the leaf springs 9a and 9b may simply be fixed at one end to the movable part and at the other end to the stationary part.

As illustrated in FIG. 9, in the assembled state of the camera module 100, a protrusion 19 on the bottom of the lens holder 8 is in abutting contact with the base 15. At this time, downward pressure is applied to the lens holder 8 by the elastic force of the leaf springs 9a and 9b.

The thickness of the camera module 100 of a straight type according to the related art mentioned above is determined from the optical length from the tip of the lens to the image sensor plane, the thicknesses of the image sensor, the substrate, and other components, and the amount by which the entire lens is to be shifted as a unit for focusing (to be also referred to as "amount of unit shift of the lens" hereinafter). A value obtained by adding the optical length and the amount of unit shift mentioned above is herein referred to as overall optical length.

Among the above-mentioned values, the optical length is generally proportional to the focal length (angle of view), and the amount of unit shift of the lens is roughly proportional to the square of the focal length as given by the following equations:

$1/a + 1/b = 1/f \Rightarrow b = af/(a-f)$, and $d = b - f = f^2/(a-f) \cong f^2/a$ (where $f \ll a$), where a represents the distance from the lens principal point to the subject, b represents the distance from the lens principal point to the image plane, f represents the actual focal length, and d represents the amount of unit shift of the lens for achieving focus from infinity to a position at the distance a.

For example, for the camera module 100 of a straight type according to the related art, it is common to employ a wide-angle lens, and a 35 mm-equivalent focal length of about 25 mm is used. As for the optical length and the amount of unit shift in this case, if the sensor used is a ½" sensor, the optical length is 5 mm, and the amount of unit shift for focusing at 10 cm is determined from the above-mentioned equation to be about 0.2 mm.

Recent years have seen the advent of electronic devices such as so-called multi-lens-equipped or multi-lens-camera-equipped smartphones. Such electronic devices incorporate a camera module with a super-wide angle or telephoto lens in addition to a wide-angle camera. When used in combination with digital correction, such electronic devices offer usability like that of a zoom camera.

To achieve a zoom factor of 4 with a dual lens camera, if the wide angle-side optical system has a 35 mm-equivalent focal length of 25 mm, then an optical system with a 35 mm-equivalent focal length of 100 mm is used for the telephoto side. As for the optical length and the amount of unit shift in this case, assuming that a ½" sensor is used, the optical length is 19 mm, and the amount of unit shift is about 4.2 mm. This results in a module thickness greater than or equal to about four times that of a camera using the same sized sensor. Accordingly, a smaller sensor size is often used for the telephoto side. However, even with a ¼" sensor, the optical length is 10 mm, and the amount of unit shift is about 1.2 mm, which results in a module thickness greater than or equal to about twice that of a camera using the same sized sensor.

Figure 10:
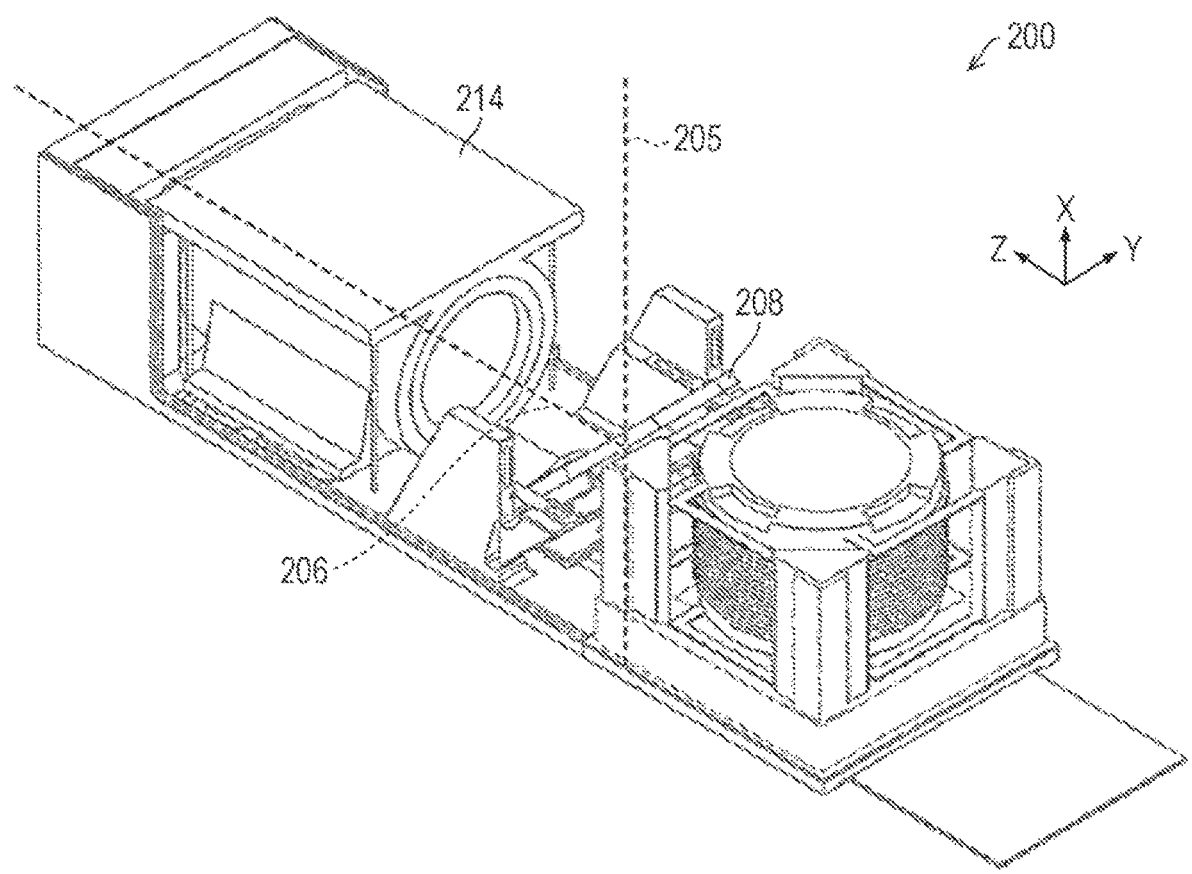
FIG. 10 is a perspective view of a camera module according to another comparative example.

Accordingly, to reduce the thickness of the telephoto-side camera module, a camera module structure using a folded optical system as illustrated in FIG. 10 has been proposed. FIG. 10 is a perspective view of a camera module 200 according to another comparative example.

As illustrated in FIG. 10, the camera module 200 of a folded type includes a reflector element 208 such as a prism or a mirror, which makes it possible to tilt the direction of the optical axis from a direction 205, which is a direction perpendicular to the smartphone back surface, to a direction 206, which is a direction parallel to the smartphone back surface.

If a combination of the unit-focusing system and the folded optical system is to be used for the camera module 200 illustrated in FIG. 10, this involves providing, between a lens barrel 214 and the reflector element 208, a gap distance greater than or equal to the amount by which the entire lens barrel 214 is to be shifted as a unit by the lens drive device. The presence of such gap distance causes a light beam to spread by an amount corresponding to the lens's angle of view. Spreading of a light beam leads to a corresponding increase in the size of the reflector element 208 to be provided. This also leads to an increase in the thickness or footprint of the camera module 200.

Accordingly, an attempt to obtain a lens drive device that allows for an increased amount of unit shift may result in increased size of the camera module 200. This may make it difficult to reduce the size and weight of the camera module 200.

An increase in the size of the lens drive device leads to an increase in power consumption. This may affect the battery life of an electronic device incorporating the camera module 200 or miniaturization of a terminal incorporating the camera module 200, and also even battery cost.

A VCM lens drive device, regardless of whether the device is used for a straight or folded system, typically employs a structure in which the movable part of the lens drive device is supported by means of a spring. Accordingly, an increase in focal length or amount of unit shift results in a corresponding increase in the repulsion force of the spring. This may cause problems such as increased amount of propulsion to be provided, and increased stain on the spring due to increased deformation of the spring. The strain on the spring induces tilting of the operating axis of the lens drive device relative to the optical axis. Such tilting of the optical system may lead to degradation of the quality of the captured image.

In this regard, the optical system 304 of the camera module 300 according to each of Embodiments 1 to 5 includes the first lens group G1, which is of positive overall power with two or more lenses and receives object light, and the second lens group G2, which is of negative overall power with one or more lenses and disposed rearward of the first lens group G1 to collect object light onto the imager, and the first lens group G1 and the second lens group G2 satisfy conditional expressions (1) to (5) below:

$-6.0 < f/f2 < -2.0$ (1)

$ih/f < 0.4$ (2)

$0.7 < TTL/f < 1.0$ (3)

$1.6 < Fno < 7.0$ (4)

$De2 < De1$. (5)

Consequently, focusing on a close-range object that emits object light can be performed by moving the second lens group G2 along the second optical axis 302. This allows the above-mentioned focusing to be achieved by extending only the second lens group G2, rather than by using the unit-focusing system. This makes it possible to achieve reductions in the size and weight of the optical system 304 and the camera module 300.

Concluding Remarks

The optical system 304 according to an aspect of the present disclosure includes the first lens group G1, the second lens group G2, and the lens drive device 305. The first lens group G1 receives object light. The first lens group G1 includes two or more lenses (first and second lenses L1 and L2) and has positive power as a whole. The second lens group G2 is disposed rearward of the first lens group G1 to collect light onto the imager 306. The second lens group G2 includes one or more lenses (third lens L3), and has negative power as a whole. The lens drive device 305 drives the second lens group G2 along the optical axis (second optical axis 302) of the second lens group G2. During focusing on an object at close range that emits object light, a distance between the first lens group G1 and the imager 306 along the optical axis (second optical axis 302) does not change. The first lens group G1 and the second lens group G2 satisfy the conditional expressions (1) to (5) below:

$$-6.0 < f/f2 < -2.0 \tag{1}$$

$$ih/f < 0.4 \tag{2}$$

$$0.7 < TTL/f < 1.0 \tag{3}$$

$$1.6 < Fno < 7.0 \tag{4}$$

$$De2 < De1, \tag{5}$$

where f represents an actual focal length of the first lens group G1 and the second lens group G2 as a whole, f2 represents a focal length of the second lens group G2, ih represents a maximum image height of the first lens group G1 and the second lens group G2 as a whole, TTL represents a distance to an image plane from an object-side surface of a lens, the lens being a lens of the first lens group G1 that is located closest to the object, Fno represents an F-number of the first lens group G1 and the second lens group G2 as a whole, De1 represents an optical effective diameter of the first lens group G1, and De2 represents an optical effective diameter of the second lens group G2.

According to the above-mentioned configuration, the first lens group G1, which is of positive overall power with two or more lenses and receives object light, and the second lens group G2, which is of negative overall power with one or more lenses and disposed rearward of the first lens group G1 to collect object light onto the imager, satisfy conditional expressions (1) to (5) below:

$$-6.0 < f/f2 < -2.0 \tag{1}$$

$$ih/f < 0.4 \tag{2}$$

$$0.7 < TTL/f < 1.0 \tag{3}$$

$$1.6 < Fno < 7.0 \tag{4}$$

$$De2 < De1. \tag{5}$$

Consequently, focusing on a close-range object that emits object light can be performed by moving the second lens group G2 along the optical axis of the second lens group. This allows the above-mentioned focusing to be achieved by extending only the second lens group, rather than by using the unit-focusing system. This makes it possible to reduce the size and weight of the optical system.

According to a second aspect of the present disclosure, in the optical system 304 according to the first aspect, the first lens group G1 may include the first lens L1 and the second lens L2. The first lens L1 may have positive power. The second lens L2 may have negative power. The second lens group G2 may include the third lens L3 having negative power.

The above-mentioned configuration makes it possible to reduce the size and weight of the optical system including the first lens group, which includes the first lens of positive power and the second lens of negative power, and the second lens group, which includes the third lens of negative power.

According to a third aspect of the present disclosure, in the optical system 304 according to the second aspect, the first lens group G1 may further include the fourth lens L4 having positive power, and the second lens group G2 may further include the fifth lens L5 having positive power.

The above-mentioned configuration makes it possible to reduce the size and weight of the optical system including the first lens group, which includes the first lens of positive power, the second lens of negative power, and the fourth lens of positive power, and the second lens group, which includes the third lens of negative power and the fifth lens of positive power.

According to a fourth aspect of the present disclosure, in the optical system 304 according to any one of the first to third aspects, if a represents a distance to a subject at close range located at 5 cm to 1 m from a principal point of the first lens group G1 and the second lens group G2 as a whole, and if d represents a driving distance that the second lens group G2 is to be driven for focusing from infinity to the subject located at the distance a, then the distance a, the driving distance d, and the focal length f2 may satisfy the conditional expression (6) below:

$$a \times d/f^2 < 0.3 (50 < a < 1000). \tag{6}$$

According to the above-mentioned configuration, the conditional expression (6) defines the amount of drive to be provided by the lens drive device to achieve focus. Satisfying this condition may facilitate further simplification of the configuration of the lens drive device.

The camera module 300 according to a fifth aspect of the present disclosure may include the optical system 304 according to any one of the first to fourth aspects of the present disclosure, and the imager 306 having the image plane 307 onto which object light is collected after passing through the optical system 304. The imager 306 may perform photoelectric conversion on the object light.

According to the above-mentioned configuration, the camera module includes the optical system according to an embodiment of the present disclosure, and the imager that collects object that has passed through the optical system. This makes it possible to reduce the size and thickness of the camera module.

According to a sixth aspect of the present disclosure, in the camera module 300 according to the fifth aspect, the lens drive device 305 may operate based on a voice coil motor (VCM) system.

Such a VCM system is commonly used as an actuator device for compact camera modules. In some embodiments of the present disclosure, the VCM system may be used from the viewpoint of size, performance, cost, and other factors.

According to a seventh aspect of the present disclosure, in the camera module 300 according to the fifth or sixth aspect, the camera module 300 may further include the reflector element 303 disposed forward of the first lens group G1 of the optical system 304. The reflector element 303 may bend the object light emitted along the first optical axis 301, and direct the object light along the second optical axis 302. The optical system 304 may collect the object light onto the image plane 307 along the second optical axis 302.

In some embodiments, the above-mentioned configuration may be employed to achieve a camera module structure with a folded optical system, such that the direction of the optical axis can be tilted from a direction perpendicular to the smartphone back surface to a direction parallel to the smartphone back surface.

The present disclosure is not limited to the embodiments mentioned above but various modifications or alterations are possible within the scope of the appended claims. Embodiments obtained by appropriately combining technical measures disclosed in different embodiments also fall within the technical scope of the present disclosure. Further, technical measures disclosed in individual embodiments may be combined to provide new technical features.

The present disclosure contains subject matter related to that disclosed in Japanese Priority Patent Application JP 2021-144205 filed in the Japan Patent Office on Sep. 3, 2021, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical system comprising:
a first lens group that receives object light, the first lens group including two or more lenses and having positive power as a whole;
a second lens group disposed rearward of the first lens group to collect light onto an imager, the second lens group including one or more lenses and having negative power as a whole; and
a lens drive device that drives the second lens group along an optical axis of the second lens group,
wherein during focusing on an object at close range that emits object light, a distance between the first lens group and the imager along the optical axis does not change, and
wherein the first lens group and the second lens group satisfy conditional expressions (1) to (5) below:

$$-6.0 < f/f2 < -2.0 \quad (1)$$

$$ih/f < 0.4 \quad (2)$$

$$0.7 < TTL/f < 1.0 \quad (3)$$

$$1.6 < Fno < 7.0 \quad (4)$$

$$De2 < De1, \quad (5)$$

where
f represents an actual focal length of the first lens group and the second lens group as a whole,
f2 represents a focal length of the second lens group,
ih represents a maximum image height of the first lens group and the second lens group as a whole,
TTL represents a distance to an image plane from an object-side surface of a lens, the lens being a lens of the first lens group that is located closest to the object,
Fno represents an F-number of the first lens group and the second lens group as a whole,
De1 represents an optical effective diameter of the first lens group, and
De2 represents an optical effective diameter of the second lens group.

2. The optical system according to claim 1,
wherein the first lens group includes a first lens and a second lens, the first lens having positive power, the second lens having negative power, and
wherein the second lens group includes a third lens having negative power.

3. The optical system according to claim 2,
wherein the first lens group further includes a fourth lens having positive power, and
wherein the second lens group further includes a fifth lens having positive power.

4. The optical system according to claim 1,
wherein if
a represents a distance to a subject at close range located at 5 cm to 1 m from a principal point of the first lens group and the second lens group as a whole, and
d represents a driving distance that the second lens group is to be driven for focusing from infinity to the subject located at the distance a,
the distance a, the driving distance d, and the focal length f2 satisfy a conditional expression (6) below:

$$a \times d/f^2 < 0.3 (50 < a < 1000). \quad (6)$$

5. A camera module comprising:
the optical system according to claim 1; and
an imager having an image plane onto which object light is collected after passing through the optical system, the imager being configured to perform photoelectric conversion on the object light.

6. The camera module according to claim 5, wherein the lens drive device operates based on a voice coil motor (VCM) system.

7. The camera module according to claim 5, further comprising
a reflector element disposed forward of the first lens group of the optical system,
wherein the reflector element bends the object light emitted along a first optical axis, and directs the object light along a second optical axis, and
wherein the optical system collects the object light onto the image plane along the second optical axis.

* * * * *